INVENTORS.
Charles F. Oldershaw
BY Joseph F. Valle-Riestra

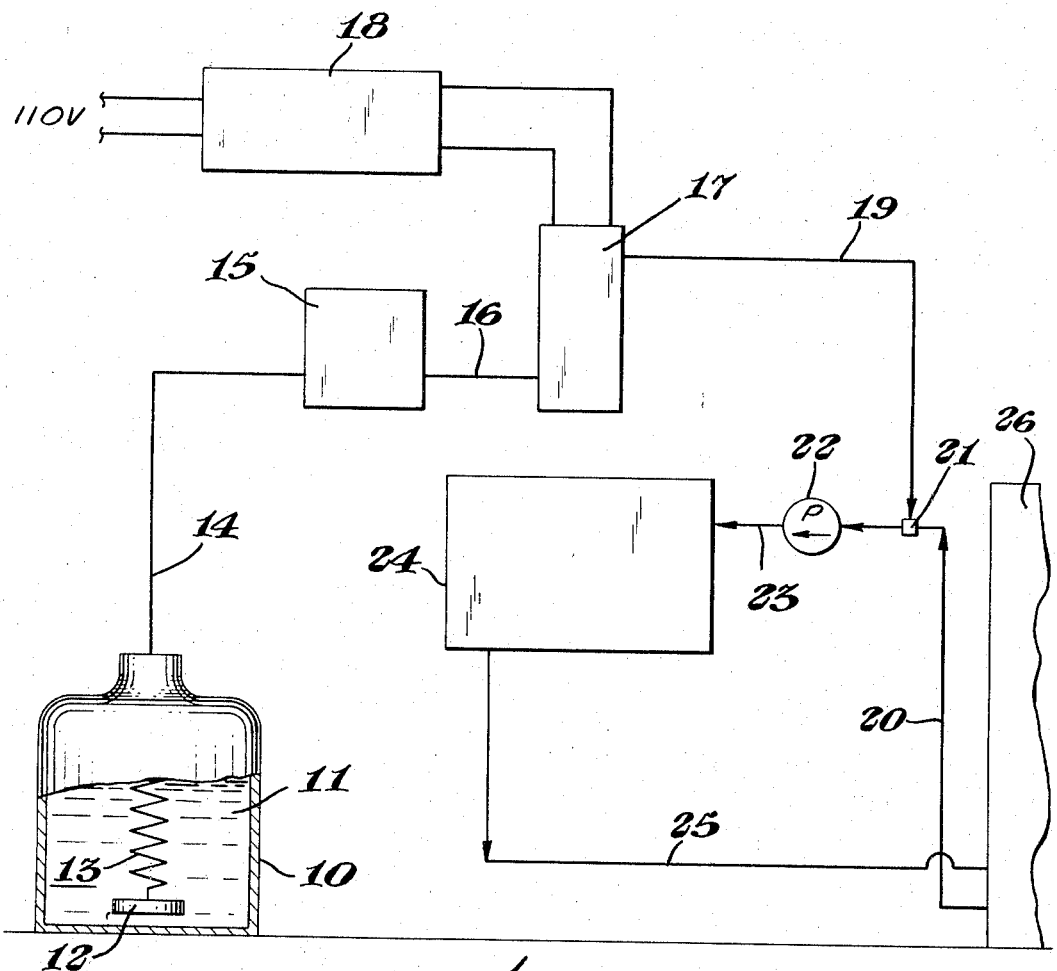
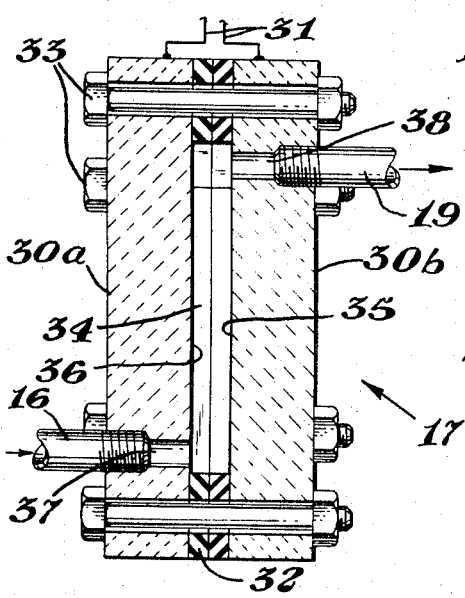
Fig. 1
Fig. 2
INVENTORS.
Charles F. Oldershaw
BY Joseph F. Valle-Riestra
Griswold & Burdick
ATTORNEYS Nov. 7, 1967     C. F. OLDERSHAW ET AL     3,351,542
ELECTROLYTIC CHLORINATION AND pH CONTROL
OF SWIMMING POOL WATER
Filed Nov. 14, 1966                          3 Sheets-Sheet 2

Griswold & Burdick
ATTORNEYS

INVENTORS.
Charles F. Oldershaw
Joseph F. Valle-Riestra
BY
Griswold & Burdick
ATTORNEY

United States Patent Office 3,351,542
Patented Nov. 7, 1967

3,351,542
ELECTROLYTIC CHLORINATION AND pH CONTROL OF SWIMMING POOL WATER
Charles F. Oldershaw, Concord, and Joseph F. Valle-Riestra, Walnut Creek, Calif., assignors to The Dow Chemical Company, Midland, Mich., a corporation of Delaware
Filed Nov. 14, 1966, Ser. No. 593,940
3 Claims. (Cl. 204—149)

This is a continuation-in-part of U.S. patent application Ser. No. 331,833, filed Dec. 19, 1963.

This invention relates to an apparatus for the production of chlorine and its introduction to a water stream, and more particularly to an apparatus and method for preparing and introducing chlorine and hydrochloric acid into swimming pool water by means of an electrolytic cell.

Chlorine is a well-known disinfectant for use in swimming pools and other water supplies. Previously, however, chlorine has been introduced to swimming pool water, for example, by adding chemicals which decompose to yield chlorine or by the direct addition of chlorine to the water.

Addition of chemicals to the swimming pool water generally requires frequent testing of the water and manual addition of the chemicals. Further, residual salts and the like may give an undesirable taste to the water.

Direct addition of chlorine to the water, while more precise then other methods, heretofore generally has not been desired. The usual swimming pool owner is not equipped to handle pure chlorine, nor is he desirous of having chlorine on the premises.

In many pools, particularly those with high carbonate make-up water, acid demand for proper pH maintenance is also important. The addition of chlorine to the water will yield two equivalents of acid for each mole of chlorine. However, many pools have an acid demand for proper pH maintenance which is in excess of that supplied by the hydrolyzed chlorine. Therefore, in many instances both chlorine and hydrochloric acid must be added in order to maintain clear, disinfected swimming pool water. Previously swimming pool owners have had to add additional acid manually to the pools to maintain the pH requirement. This is undesirable from the standpoint of maintaining proper pH control and handling of the acid by the owner.

We have discovered a novel process and apparatus whereby both chlorine and hydrochloric acid may be introduced to swimming pool water at a predetermined rate. The novel apparatus functions to maintain the pH of the water and the chlorine concentration within a predetermined range (about 0.4 to about 1.0 part chlorine per million parts of $H_2O$) thereby to provide swimming pool water which is kept substantially free of bacteria and algae.

A better understanding of the present invention may be obtained in light of the appended drawings in which:

FIGURE 1 is a schematic showing the general flow and installation of the present invention;

FIGURE 2 is a sectional side elevation showing one embodiment of the electrolytic cell employed in the present apparatus;

Figure 5:
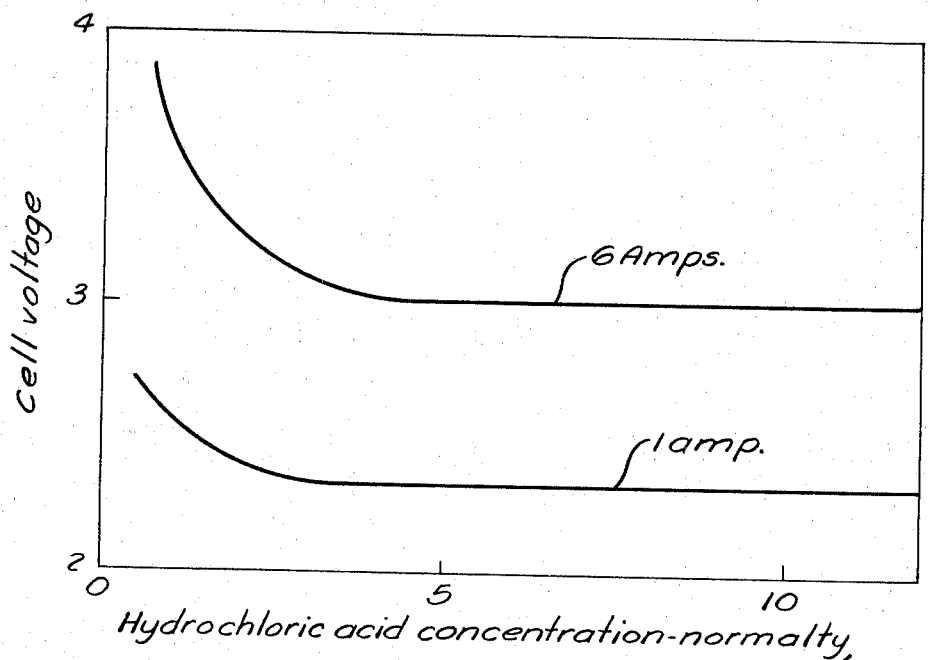
FIGURE 5 is a curve showing cell voltage as a function of acid concentration.

In accordance with the apparatus and method of our invention, chlorine is produced electrolytically from a cell containing hydrochloric acid. This gas in admixture with the co-produced hydrogen and unreacted weak hydrochloric acid is passed as a froth from the cell into a stream of swimming pool water. Generally, since most swimming pools are equipped with means whereby a portion of the water is withdrawn and filtered on a continuous basis and returned to the pool, the present invention contemplates that the cell communicates with such a filtration system or alternately a separate stream of water may be withdrawn from the pool, treated and returned.

FIGURE 1 schematically illustrates one embodiment of the present invention installed in a swimming pool filtration system. As depicted in FIGURE 1, the apparatus comprises an acid reservoir 10 which during the operation of the apparatus contains a supply of an aqueous electrolyte containing hydrogen chloride 11. Located within the reservoir 10 is a filter 12 which is connected to one end of a capillary 13. The opposite end of the capillary 13 in turn is connected to a transportation line 14 which passes from the reservoir 10 and has its other end connected to one side of an acid control valve 15. A transportation line 16 connects the acid control valve 15 to an eletcrolytic cell 17. The electrolytic cell 17 is activated by a source of direct current 18, such as a rectified direct current supply. The electrolytic cell 17 also is connected to one end of a transportation line 19. The other end of transportation line 19 is connected to the drain line 20 of a swimming pool filtration system through an adaptor means 21.

The filtration system depicted is a conventional type common to many swimming pools and comprises a drain line 20 which is connected at one end to the lower portion of a swimming pool 26 and is connected at the other end to a circulating pump 22. The circulating pump 22 communicates with a water filter means 24 by a fluid transportation line 23. The filter means 24 is in turn connected to one end of transportation line 25, and the other end of which communicates with the swimming pool 26.

The present apparatus can be operated by either a manually controlled power supply (not shown) or an automatic timing means (not shown) to engage and disengage the power supply to the apparatus.

Figure 3:
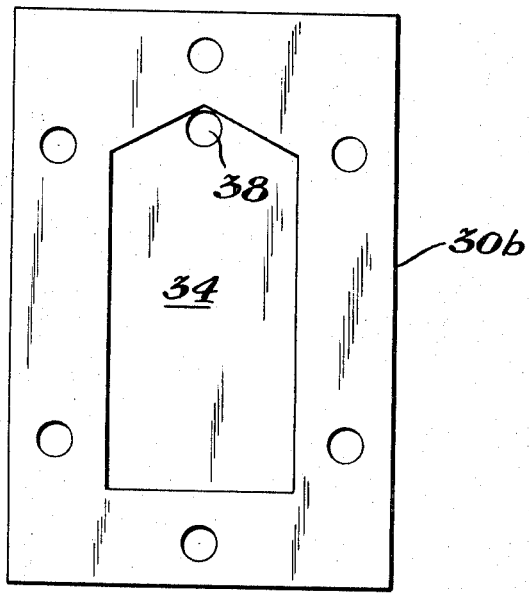
FIGURE 3 is a sectional front elevation of the cell depicted in FIGURE 2.

FIGURES 2 and 3 depict two views of an electrolytic cell 17 which can be employed in the present apparatus. The electrolytic cell 17 is composed of two graphite plates 30a and 30b, electrically connected to a source of direct current 31 and separated with electrically insulating gasket 32 which is substantially inert to the reactants and reactant products. The graphite plates 30a and 30b ordinarily are fastened together, with insulating gasket 32 separating them, at the top and bottom for example, by means of plastic bolt and nut assemblies 33. This assembly provides an air and light proof chamber 34 between the inner faces 35 and 36 of plates 30a and 30b. During operation of the cell the plates 30a and 30b provide cathode and anode surfaces.

Plate 30a is provided with an inlet port 37 near its bottom. This inlet port is designed to provide a connection with one end of transportation line 16. Plate 30b is provided with an exit port 38 near the top. This exit port is designed to connect with one end of liquid transportation line 19.

Electrode material for the anode and cathode plates 30a and 30b employed in the electrolytic cell of the present invention may be any suitable material which does not react with or is detrimentally attacked by hydrochloric acid, hydrogen or chlorine at the reaction conditions. Because of their high efficiency in the present cell, relatively inexpensive, easy to fabricate resin impregnated graphite plates ordinarily are employed.

Figure 4:
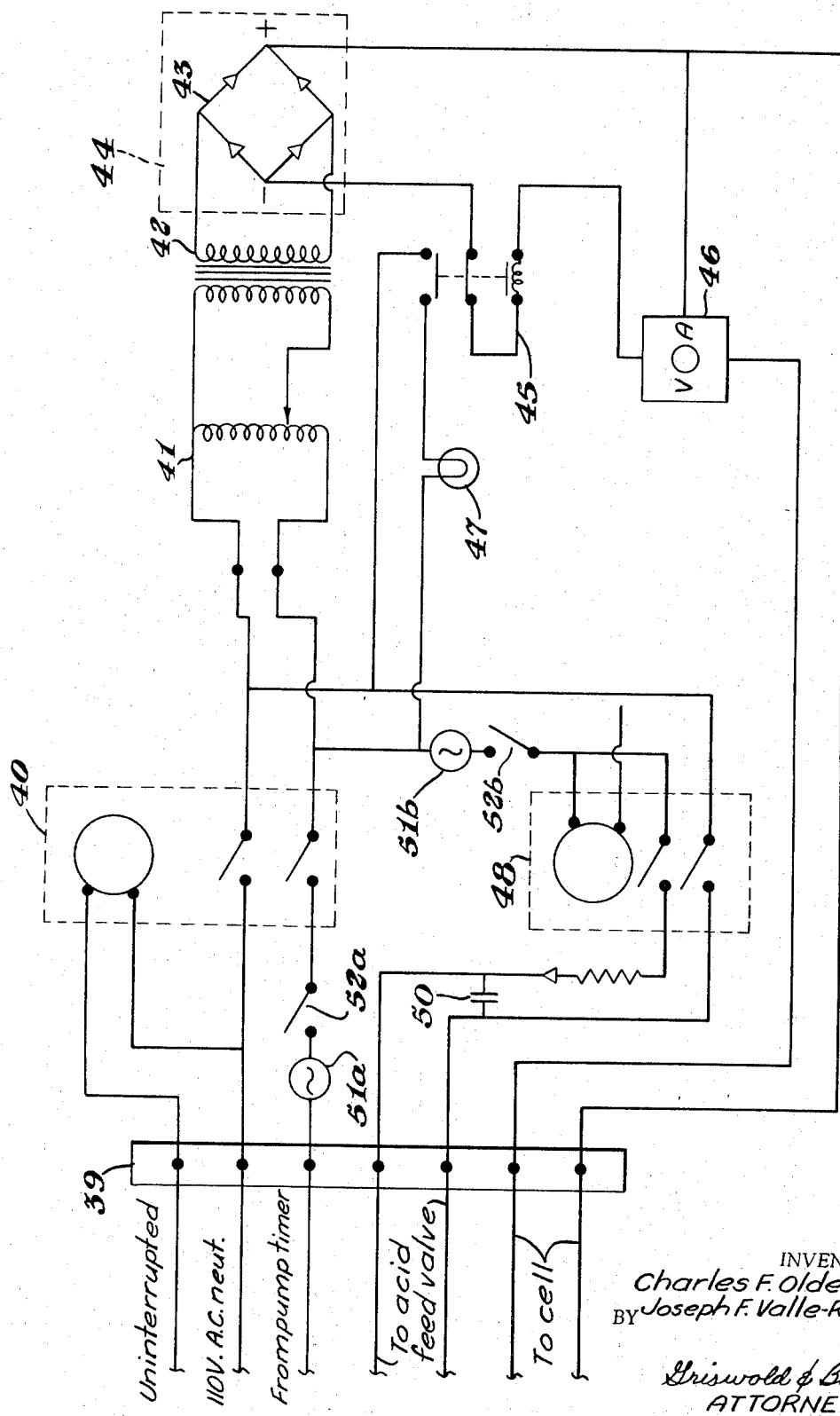
FIGURE 4 is a circuit diagram associated with the apparatus.

The apparatus described herein is made operable and is controlled by means of an electrical power supply which is controlled by means of an electrical wiring circuit, one embodiment of which is shown in circuit diagram FIGURE 4. The power supply may be derived from any uninterrupted 110 volt A.C. power source. The circuit diagram associated with the present invention and set forth in FIGURE 4 comprises an electrical power supply which is conducted through terminal plate 39. The electrical power source is wired to an electrolytic cell on-off timer 40, which, in turn, is wired to a variable current controller 41. The variable current controller 41 is wired to a transformer 42 and the transformer 42 in turn is wired to rectifier 43 on a heat sink 44. The system is then wired through current relay 45 which remains in the closed position as shown during the normal operation of the system. The power supply is then connected to an ampere and volt meter 46 and finally through terminal plate 39 to an electrolytic cell (not shown in the diagram).

The circuit also contains an acid valve on-off timer 48 which derives its power from the electrolytic cell on-off timer 40. The acid valve on-off timer 48 is in turn connected through diode 50 and through terminal plate 39 to the acid feed control valve, (not shown in the circuit diagram).

Also included in the circuit are fuses 51a and 51b and manual on-off switches 52a and 52b. The circuit is also provided with a warning light 47 which is actuated when the electrical relay 45 is in its alternative position.

The apparatus and its associated wiring circuit provides for introducing a predetermined ratio of hydrochloric acid and chlorine into swimming pool water at a predetermined rate.

Other circuits, timers, and valve control assemblies can be used as is understood by one skilled in the art.

In general, in the actual operation of the present invention, aqueous hydrochloric acid (about 20% HCl by weight) is valved in controlled amounts from reservoir 10 to the electrolytic cell 17 therein being decomposed to form chlorine gas. This gas with coproduced hydrogen and unreacted weak hydrochloric acid passes from the electrolytic cell into a stream of water from the swimming pool 26, thereby dissolving the chlorine in the water. After dissolution of the chlorine and addition of the hydrochloric acid to the water, the water is returned to the swimming pool.

More specifically as illustrated in FIGURE 1, in a typical operation, a stream of water from the swimming pool 26 is continuously circulated through drain line 20 to filter 24 by the circulating pump 22 and then is returned to the swimming pool through transportation line 25. The filtration system shown in FIGURE 1, as indicated hereinbefore, in common to many swimming pools. The new chlorine generating and metering apparatus of the present invention can be connected directly to this filtration system in order to produce and introduce chlorine, hydrogen and a weak hydrochloric acid into the swimming pool water. In accordance with the operation of the novel apparatus, a partial vacuum is created in line 20 at point 21 by virtue of the suction of the circulating pump 22 and the fact that point 21 is above the pool water level. The thus created reduced pressure pulls hydrochloric acid from reservoir 10 and into acid control valve 15 through transportation line 14. The acid valve discharges a perdetermined controlled quantity of hydrochloric acid into transportation line 16 and into electrolytic cell 17 where a portion of the acid is electrolyzed by direct current passing through the cell forming chlorine and hydrogen gas and less concentrated hydrochloric acid. This product mixture passes out of electrolytic cell 17 as a froth and is transported through line 19 by virtue of the aforementioned partial vacuum in the line and is introduced into the swimming pool water at connection 21 in drain line 20.

By independently controlling the acid flow through the electrolytic cell and the electrolyzing current, a wide range of chlorine gas to acid ratios may be established in the electrolytic cell product discharge. This provides the unexpected advantage of assuring positive chlorine and pH control depending on the demand of any given pool or water source.

The acid flow is controlled by two mechanisms. The maximum acid flow from the reservoir to the electrolytic cell is controlled by means of a glass capillary 13 upstream from the cell. The actual amount of acid passing through the cell during its operation is controlled by a percentage timer (No. 48 in wiring diagram FIGURE 4) which opens and closes acid valve 15. Ordinarily, in carrying out the process using the apparatus of the present invention acid flows to the electrolytic cell less than 100% of the time.

Current may be controlled by a variable current controller (No. 41, FIGURE 4) or other conventional controls. The actual current flow between the anode and cathode plates 30a and 30b and the rate of flow of hydrochloric acid to the cell generally are based on the requisite chlorine and acid demand of a given swimming pool. Knowing the required rate of chlorine production, the minimum current flow to obtain the product mixture may be calculated, as by Faraday's law. Since the cell and method of the present invention approach 100 percent efficiency, the calculation is generally sufficiently accurate.

For a given cell, the voltage required to provide the desired amperage is generally a function of the cell geometry and is usually independent of the acid concentration except when the concentration becomes low. Typical curves showing the relation between acid concentration and voltage in a cell of the type employed in the present invention are illustrated in FIGURE 5. Once the desired rate of chlorine production is determined, the correct voltage to be applied across the electrodes may be found. As the acid concentration is lowered by removal of chlorine from the cell, the voltage required remains fairly constant until the resistivity of the acid starts to become appreciable. In order to overcome the increased resistance, greater voltage is required and polarization is likely to occur. For this reason, it is desirable, although not required, to operate in the relatively flat portion of the voltage-concentration curves, as shown in FIGURE 5.

Generally from about 2 to about 4 volts is an appropriate operating voltage, depending on the amperage required, cell geometry, and acid concentration.

To illustrate, when the acid concentration in the cell is less than about 3 percent by weight, polarization may occur with possible degradation of the electrode material and in any case efficiency will be lowered. The use of the independent controls heretofore described for controlling acid and electrical output may lead to a situation where not enough acid is passed through the cell to generate the demanded chlorine. In such a case the hydrochloric acid content of the liquid in the cell would be depleted and oxygen instead of chlorine would be generated. This would result in the rapid corrosion of the graphite electrodes and this, of course, is undesirable. To prevent any undue corrosion, advantage can be taken the fact that, as set forth hereinbefore, when the acid becomes weaker its electrical resistivity suddenly increases.

An electrical circuit of the type shown in FIGURE 4 is desirable in order to give a warning when the acid concentration becomes detrimentally low. By means of this circuit the power to the electrolytic cell is controlled by means of variable current controller 41 and the voltage is stepped down 20 fold in transformer 42. The power is rectified in a silicon diode bridge 43 which is mounted on a heat sink 44. The direct current to the cell then passes through a circuit relay 45 which remains in the closed position shown whenever a normal amount of current flows. When the acid in the electrolytic cell becomes too weak, its electrical resistivity suddenly increases (FIGURE 5) and with a given variable current controller setting 41, the cell current will diminish to the point where the relay coil flux decreases to a point where relay 45 opens and activates the circuit to warning light 47. If desired, the same relay may be used to interrupt current flow to the electrolytic cell, however, this would necessitate a reset circuit not shown in FIGURE 4.

In the event that the circulating system should become inoperative and the flow of swimming pool water falls below normal, it is desirable to discontinue the flow of acid so that it will not continue to be sucked into the non-circulating water in the pump suction lines 21. To prevent such a flow the acid valve heretofore described which controls the flow of acid into the cell can be provided with a fail-safe mechanism whereby it automatically closes when the partial vacuum created in line 20 at point 21 falls below a predetermined level. Also, the current supply to the acid control valve on-off timer 48 is derived directly from the electrolytic cell on-off timer 40 so that when the electrolytic cell is shut down the acid control valve is also inoperative.

As an alternative means of control, the power to the electrolytic cell can be shut off when the circulating pump fails to operate. This also is achieved with an electrical circuit set-up such as illustrated in FIGURE 4. In this alternative embodiment an on-off timer 40 is set to operate the electrolytic cell 17 for a fixed period of time. The power to operate the clock mechanism of the on-off timer 40 is uninterrupted 110 volts A.C. The 110 volt power to the electrolytic cell circuit which is switched on and off by timer 40 comes from the circulating pump timer output. In this manner the electrolytic cell cannot operate unless the circulating pump is on, no matter what the setting of timing mechanism 40 is. Therefore, chlorine and hydrochloric acid cannot be discharged into stagnant water in the line 20 when the circulating pump 22 is inoperative.

The cell electrolyte is preferably an aqueous solution containing about 20 percent by weight hydrochloric acid.

As hereinbefore stated, an advantage of the present invention is that the acid flow is automatically shut off in the event the system fails to operate. A further advantage is that the electrolytic cell is automatically shut down when the acid concentration falls below an efficient operating level. These aspects provides a system wherein maximum efficiency and minimum breakdown time are achieved.

The following example is set forth to illustrate the actual operation of the present invention and is not meant to limit the present invention thereto.

*Example 1*

An electrolytic cell was constructed essentially of the nature as that illustrated in FIGURES 2 and 3. The cell was constructed of graphite plates with dimensions of 1" x 4" x 6". The exposed electrode area in the chamber was 2" x 4" and the electrode plates were spaced ½ inch apart. An electrical connection was made between the electrodes and a source of direct current was provided in a manner illustrated by circuit diagram, FIGURE 5. The electroyltic cell was connected to a supply of hydrochloric acid and was connected to a swimming pool filtration system in a manner as shown in FIGURE 1.

The apparatus was connected to a residential swimming pool of plaster construction with a 25,000 gallon capacity and with a surface area of 670 square feet. Six pounds of cyanuric acid initially was added to the swimming pool water and the cyanuric acid concentration was subsequently maintained at about 25 parts of cyanuric acid to one million parts of water.

Swimming pool water was caused to flow through the filtration system by means of a circulating pump and a partial vacuum was created in the apparatus. The acid reservoir was filled with hydrochloric acid (20 percent by weight HCl).

Electrical current was supplied to the apparatus in a manner set forth in FIGURE 5. The average cell current was 5.0 amperes and the average cell voltage was maintained at 4.0 volts.

The cell was in operation for over 30 months and it kept the pool "sparkling clean" with no infestation of algae. Over the period of operation the following average operating conditions were observed.

The daily electrolytic cell operating time averaged about 10 hours with 12 hours as a maximum operating time during hot weather.

The maximum daily chlorine production was 0.175 pound with an average production of 0.146 pound per day.

The acid consumption over the period of operation was approximately 1.1 gallons of hydrochloric acid per week. The rate of flow of the acid through the capillary was 1.25 cc./min. and the proportional timer was set to introduce the electrolyte into the electrolytic cell 80% of the time.

The swimming pool water, as determined by a standard o-tolidine test, maintained a chlorine concentration of 0.5 part chlorine per one million parts of water and a pH of 7.5.

Various modifications may be made in the present invention without departing from the spirit or scope thereof, and it is to be understood that we limit ourselves only as defined in the appended claims.

We claim:
1. A method for chlorinating and controlling the pH of swimming pool water which comprises:
 (a) providing an electrolytic cell having spaced apart a pair of electrodes;
 (b) providing an electrolyte for said cell, said electrolyte comprising an aqueous solution containing at a minimum about 3 weight percent hydrogen chloride;
 (c) introducing controlled amounts of said electrolyte into said electrolytic cell;
 (d) passing a predetermined amount of direct current through said electrolyte between said electrodes thereby decomposing a portion of said electrolyte and producing a product mixture containing a predetermined quantity of chlorine and hydrogen gas and an aqueous solution containing hydrochloric acid of a predetermined lower concentration; and
 (e) removing said product mixture as a froth from said electrolytic cell and introducing said froth into a stream of swimming pool water thereby to chlorinate and control the pH of said swimming pool water.

2. A process in accordance with claim 1 wherein the electrolyte is an aqueous solution containing from about 3 weight percent to 20 weight percent of hydrogen chloride.

3. A process in accordance with claim 1 wherein the direct current supplied to the electrolytic cell is maintained within the range of 2 to 4 volts.

References Cited

UNITED STATES PATENTS 1,746,542 2/1930 Low _____ 204—128
3,223,242 12/1965 Murray _____ 210—139

JOHN H. MACK, *Primary Examiner.*

A. PRESCOTT, *Assistant Examiner.*